United States Patent
Zhang

(10) Patent No.: US 12,184,169 B2
(45) Date of Patent: Dec. 31, 2024

(54) BOOST CHARGE CIRCUIT FOR DC/DC CONVERTER

(71) Applicant: Texas Instruments Incorporated, Dallas, TX (US)

(72) Inventor: Liang Zhang, Beijing (CN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 274 days.

(21) Appl. No.: 17/976,973

(22) Filed: Oct. 31, 2022

(65) Prior Publication Data

US 2024/0048048 A1    Feb. 8, 2024

Related U.S. Application Data

(60) Provisional application No. 63/395,772, filed on Aug. 5, 2022.

(51) Int. Cl.
  *H02M 3/07* (2006.01)
  *H02M 1/08* (2006.01)

(52) U.S. Cl.
  CPC ............. *H02M 3/07* (2013.01); *H02M 1/08* (2013.01)

(58) Field of Classification Search
  CPC ......... H02M 3/07; H02M 1/08; H02M 3/1582
  See application file for complete search history.

(56) References Cited

U.S. PATENT DOCUMENTS

| | | | |
|---|---|---|---|
| 7,145,316 B1 | 12/2006 | Galinski | |
| 9,312,773 B2 | 4/2016 | Li | |
| 9,484,758 B2 * | 11/2016 | Chen | H02M 3/1588 |
| 9,577,520 B2 | 2/2017 | Xiu | |
| 10,181,793 B2 | 1/2019 | Zhang | |
| 10,491,112 B2 | 11/2019 | Li | |
| 11,038,423 B2 | 6/2021 | Chen et al. | |
| 2007/0146020 A1 * | 6/2007 | Williams | H02M 3/158 327/110 |
| 2009/0315595 A1 * | 12/2009 | Nakagawa | H03K 19/018571 327/109 |
| 2009/0315609 A1 * | 12/2009 | Nakazono | H03K 19/018571 327/333 |
| 2011/0133711 A1 * | 6/2011 | Murakami | H02M 1/32 323/282 |
| 2013/0099846 A1 * | 4/2013 | Sohma | H03L 5/00 327/333 |
| 2013/0265016 A1 | 10/2013 | Chang et al. | |

(Continued)

*Primary Examiner* — Thienvu V Tran
*Assistant Examiner* — Yahveh Comas Torres
(74) *Attorney, Agent, or Firm* — Ray A. King; Frank D. Cimino

(57) ABSTRACT

Described embodiments include a boost circuit for a DC-DC voltage converter includes a first transistor coupled between an input voltage terminal and a boost terminal. A second transistor is coupled between the first control terminal and a switch terminal, and has a second control terminal coupled to the switch terminal. A capacitor is coupled between the boost terminal and the switch terminal. A third transistor has a third control terminal and first and second current terminals. The first current terminal is coupled to the first control terminal, and the third control terminal is coupled to an internal voltage supply terminal. A fourth transistor is coupled between the internal voltage supply terminal and the second current terminal, and has a fourth control terminal coupled to a drive terminal.

20 Claims, 5 Drawing Sheets

(56) References Cited

U.S. PATENT DOCUMENTS

| | | | |
|---|---|---|---|
| 2014/0043009 A1* | 2/2014 | Sakai | H01L 27/0629 |
| | | | 257/296 |
| 2015/0077081 A1* | 3/2015 | Ejury | H02M 3/158 |
| | | | 327/109 |
| 2016/0065072 A1* | 3/2016 | Xiu | H02M 1/08 |
| | | | 323/271 |
| 2019/0081549 A1* | 3/2019 | Lee | H02M 1/088 |

* cited by examiner

BOOST CHARGE CIRCUIT FOR DC/DC CONVERTER

CROSS-REFERENCE TO RELATED APPLICATION

This application claims priority to U.S. Provisional Patent Application No. 63/395,772 filed Aug. 5, 2022, which is incorporated herein by reference.

BACKGROUND

This description relates to DC-DC voltage converters, such as the voltage converters used in automotive infotainment and cluster systems, Advanced Driver Assistance Systems (ADAS), televisions, broadband communications and computers. DC-DC converters may use an N-channel field effect transistor (FET) in the high-side driver. Converter circuits that use an N-channel field effect transistor (FET) in the high-side driver can benefit from having a boost charge circuit to generate an internal voltage that is higher than the input voltage to the device.

Boost charge circuits operate by storing electrical charge in a capacitor during a charging cycle. The stored charge produces a voltage difference between the two plates of the charged capacitor. The voltage difference can be added to an input voltage level, generating a higher voltage that may be used to supply power to internal circuit components, such as a driver or an amplifier. Powering the internal components with a higher supply voltage may allow the internal components to achieve a larger output voltage range.

SUMMARY

In a first example, a boost circuit for a DC-DC voltage converter includes a first transistor having a first control terminal. The first transistor is coupled between an input voltage terminal and a boost terminal. A second transistor has a second control terminal. The second transistor is coupled between the first control terminal and a switch terminal, and the second control terminal is coupled to the switch terminal. A capacitor is coupled between the boost terminal and the switch terminal.

A third transistor has a third control terminal and first and second current terminals. The first current terminal is coupled to the first control terminal, and the third control terminal is coupled to an internal voltage supply terminal. A fourth transistor has a fourth control terminal. The fourth transistor is coupled between the internal voltage supply terminal and the second current terminal. The fourth control terminal is coupled to a drive signal terminal.

In a second example, a voltage regulator circuit includes a high-side drive circuit having a drive input, a drive output and a drive supply input. The drive input is coupled to a high-side drive signal terminal. A boost charging circuit has a boost input and a boost output. The boost input is coupled to an input voltage terminal, and the boost output is coupled to the drive supply input. A high-side transistor has a high-side control terminal. The high-side transistor is coupled between the input voltage terminal and a switch terminal, and the high-side control terminal is coupled to the drive output.

The boost charging circuit includes a first transistor having a first control terminal. The first transistor is coupled between an input voltage terminal and the boost output. A second transistor has a second control terminal. The second transistor is coupled between the first control terminal and the switch terminal, and the second control terminal is coupled to the switch terminal.

A capacitor is coupled between the boost output and the switch terminal. A third transistor has first and second current terminals and a third control terminal. The first current terminal is coupled to the first control terminal, and the third control terminal is coupled to an internal voltage supply terminal.

BRIEF DESCRIPTION OF THE DRAWINGS

FIG. 5 shows an example timing diagram for a boost charging circuit having a single drive transistor between a voltage input terminal and a boost terminal, wherein the high-side drive FET of the voltage regulator is turning on.

DETAILED DESCRIPTION

In this description, the same reference numbers depict same or similar (by function and/or structure) features. The drawings are not necessarily drawn to scale.

In some cases, DC-DC converters that use an N-channel field effect transistor (NFET) in the high-side driver may require an internal voltage that is higher than the input voltage in order to provide an adequate gate-to-source voltage to turn the NFET on. Driving the gate voltage of the NFET above the source voltage of the NFET may require additional circuitry because the source voltage of the NFET is usually at the level of the input voltage, and a higher voltage may not be available in the converter circuit.

A higher voltage to provide to the gate of the NFET may be generated from a converter circuit input voltage using a boost charge circuit within the converter circuit. The higher internal voltage may be used to power a gate driver circuit, thus increasing the output voltage range of the gate driver circuit. The higher output voltage range of the gate driver circuit allows it to provide a higher voltage to the gate of the NFET.

The boost charge circuit operates by charging up a boost capacitor during a charging cycle, which produces a voltage difference across the boost capacitor. The voltage difference across the boost capacitor is added to the input voltage, resulting in a boost voltage that is higher than the input voltage. The boost capacitor may be integrated within a converter integrated circuit or may be external to the converter integrated circuit.

Figure 1:
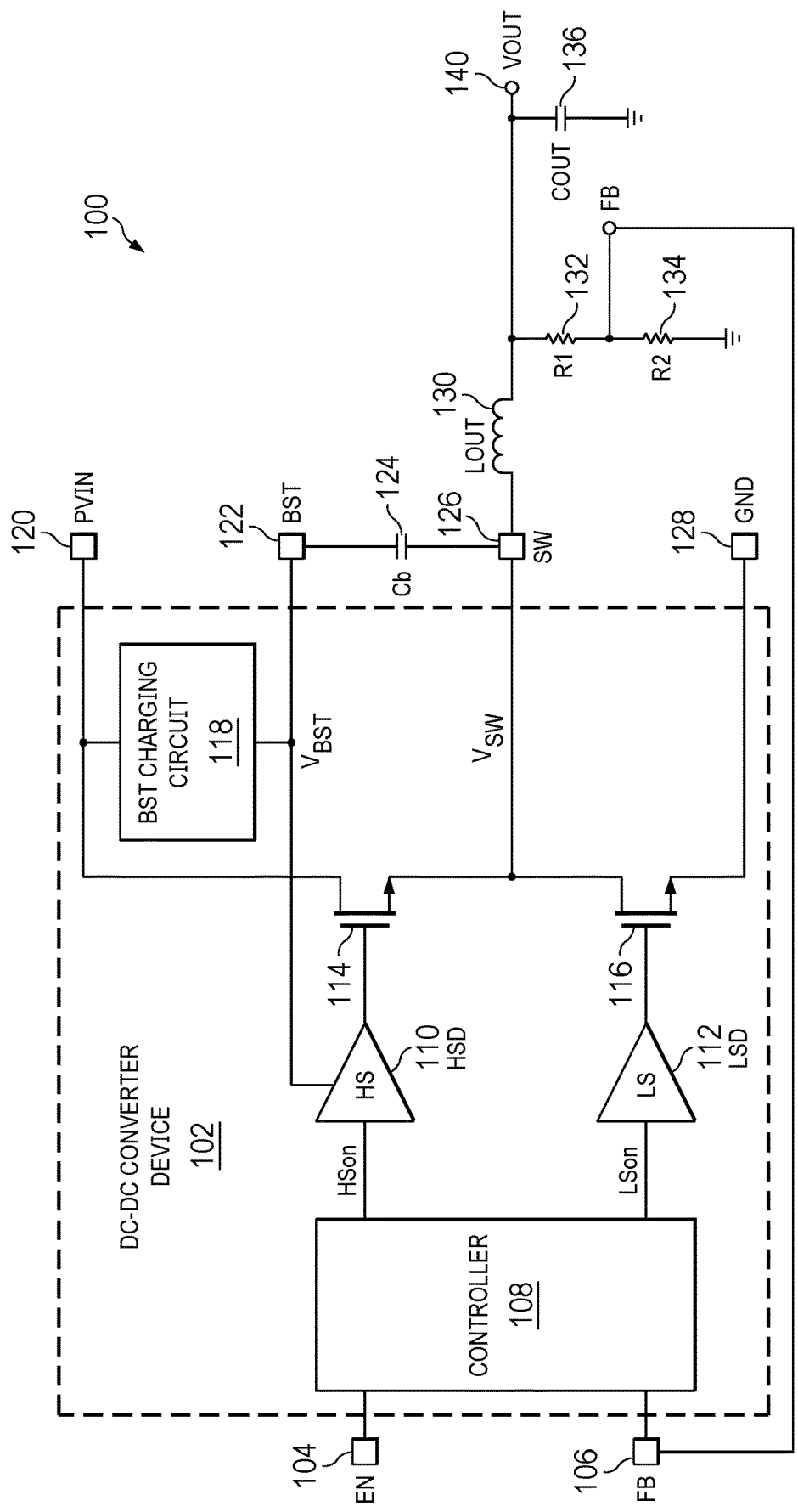
FIG. 1 shows a schematic diagram for an example DC-DC converter system having a boost charging circuit.

FIG. 1 shows a schematic diagram for an example DC-DC converter system 100 having a boost charging circuit. DC-DC converter system 100 includes a converter circuit 102, which has six terminals. An enable terminal 104 is configured to receive an enable signal for enabling or disabling the converter circuit 102. Enable terminal 104 is coupled to a first input of a controller 108. A second input to controller 108 is coupled to a feedback terminal 106, which provide a feedback voltage proportional to the output voltage VOUT 140. The feedback voltage can be used to regulate the output voltage VOUT 140 to remain within specified voltage limits.

A first output of controller 108, $HS_{on}$, is coupled to an input of high-side driver 110. A second output of controller 108, $LS_{on}$, is coupled to an input of low-side driver 112. The output of high-side driver 110 is coupled to the gate of high-side FET 114, and controls turning high-side FET 114 on or off. The output of low-side driver 112 is coupled to the gate of low-side FET 116, and controls turning low-side FET 116 on or off. High-side FET 114 is coupled between a voltage input terminal PVIN 120 and a switch terminal SW 126. Low-side FET 116 is coupled between the switch terminal SW 126 and a ground terminal GND 128.

A boost terminal BST 122 is coupled to the power input of high-side driver 110. A boost capacitor $C_B$ 124 is coupled between the boost terminal BST 122 and the switch terminal SW 126. A boost charging circuit 118 has an input coupled to the voltage input terminal PVIN 120 and an output coupled to the boost terminal BST 122. The boost charging circuit 118 boosts the voltage from PVIN 120 to a higher voltage, and the boosted voltage is provided to the supply terminal of the power high-side driver 110.

An inductor 130 is coupled between the switch terminal SW 126 and the output voltage terminal VOUT 140. Inductor 130 may be external to the converter circuit 102, or may be integrated into the converter circuit 102. Output capacitor COUT 136 is coupled between the output voltage terminal VOUT 140 and ground. Resistors R1 132 and R2 134 are coupled in series between the output voltage terminal VOUT 140 and ground, and form a voltage divider on the output voltage to produce a feedback signal. The voltage divider output is coupled to the feedback terminal FB 106.

High-side transistor 114 is an NFET. Boost capacitor $C_B$ 124 is coupled between the switching terminal SW 126 and the boost terminal BST 122. Boost capacitor $C_B$ 124 is configured to provide a boost voltage $V_{BST}$ that is higher than the voltage $V_{SW}$ at the switching terminal SW 126. The boost voltage $V_{BST}$ supplies power to the high side driver 110. In one example, the voltage $V_{BST}$ at the boost terminal BST 122 is 5V higher than the voltage $V_{SW}$ at the switching terminal SW 126.

Figure 2:
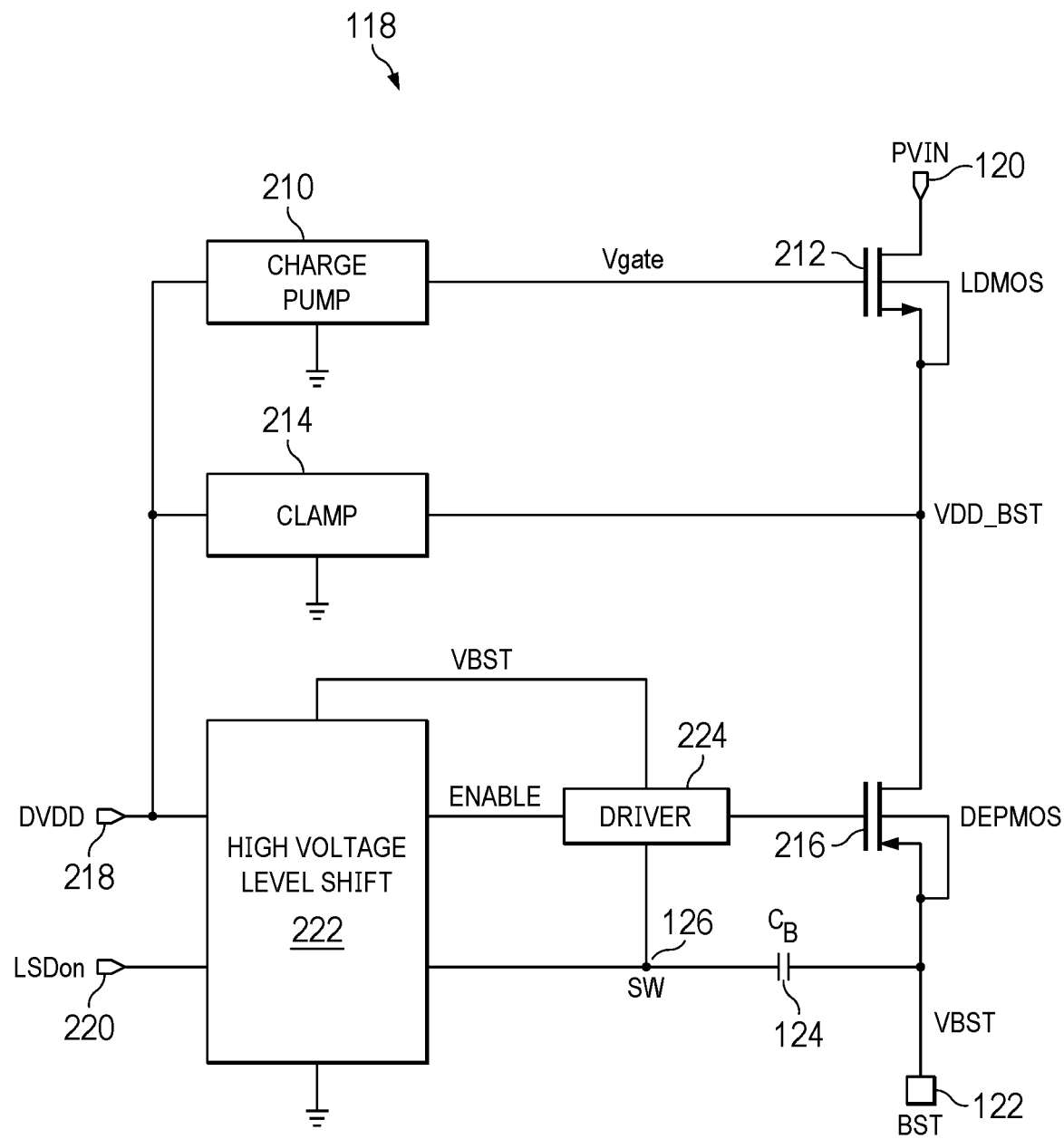
FIG. 2 shows a schematic diagram for an example boost charging circuit having two drive transistors in series between a voltage input terminal and a boost terminal.

FIG. 2 shows a schematic diagram for a boost charging circuit 118 that includes a laterally-diffused metal-oxide semiconductor (LDMOS) FET 212 and a MOS-type Depleted P-channel FET (DEPMOS) 216 coupled between the voltage input terminal PVIN 120 and the boost terminal 126. Transistors 212 and 216 are standard threshold FETs. The boost charging circuit, which includes boost capacitor $C_B$ 124 provides a boost voltage $V_{BST}$ at the boost terminal BST 122.

Clamp circuit 214 has an input coupled to DVDD 218 and an output coupled to an internal voltage terminal VDD_BST. Clamp circuit 214 holds the voltage at VDD_BST at a specified voltage. In at least one case, the voltage at VDD_BST is held at around 5V. The drain of transistor 212 is coupled to the voltage input terminal PVIN 120. The source of transistor 212 is coupled to internal voltage terminal VDD_BST. The voltage at the gate of transistor 212 is equal to (VDD_BST+$V_{th}$) where $V_{th}$ is the threshold voltage of transistor 212. Charge pump circuit 210 has an input coupled to DVDD 218, and has an output coupled to the gate of transistor 212.

Charge pump 210 ensures that the voltage at the gate of transistor 212 is always at least $V_{th}$ higher than the voltage at VDD_BST, so transistor 212 is always turned on. Transistor 212 reduces the voltage at PVIN 120 to a lower voltage, VDD_BST, which may be around 5V. Transistor 212 may be a high-voltage FET, depending on the voltage at PVIN 120, to safely handle the voltage drop between PVIN 120 and VDD_BST without damaging the FET.

Driver circuit 224 turns on transistor 216, charging boost capacitor $C_B$ 124. As boost capacitor $C_B$ 124 charges, the voltage VBST at BST 122 increases. Transistor 216 is turned on, which drives the gate of transistor 216 to the voltage at the switch terminal SW 126. Because the source of transistor 216 is at VBST, transistor 216 will only turn on if the gate of transistor 216 is at a lower voltage than VBST. The voltage at the gate of transistor 216 is provided by level shift circuit 222 and driver 224 coupled in series to the gate. The target voltage for VBST at BST 122 is 5V higher than the voltage at SW 126.

When the low-side drive FET of the voltage regulator is turned on and the high-side drive FET of the voltage regulator is turned off, the voltage at SW 126 is at ground and the voltage at the boost terminal BST 122 is around 5V. This produces a gate-to-source voltage of around 5V, turning on transistor 216. When the high-side drive FET of the voltage regulator is turned on, the voltage at SW 126 equals the voltage at PVIN 120. The gate of transistor 216 is driven to VBST, making the gate voltage equal to the source voltage. With a gate-to-source voltage of zero, transistor 216 is turned off.

Boost circuit 118 has certain disadvantages. A first disadvantage of boost circuit 118 is that it requires a significant amount of circuitry, including two high-voltage FETs, a charge pump to generate a gate voltage of (DVDD+$V_{th}$), a high voltage level shift circuit, and a driver to control the gates of transistor 212 and transistor 216 so that the boost capacitor $C_B$ 124 charges when the transistor 116 is on, then holds its charge when transistor 212 is turned off.

Figure 3:
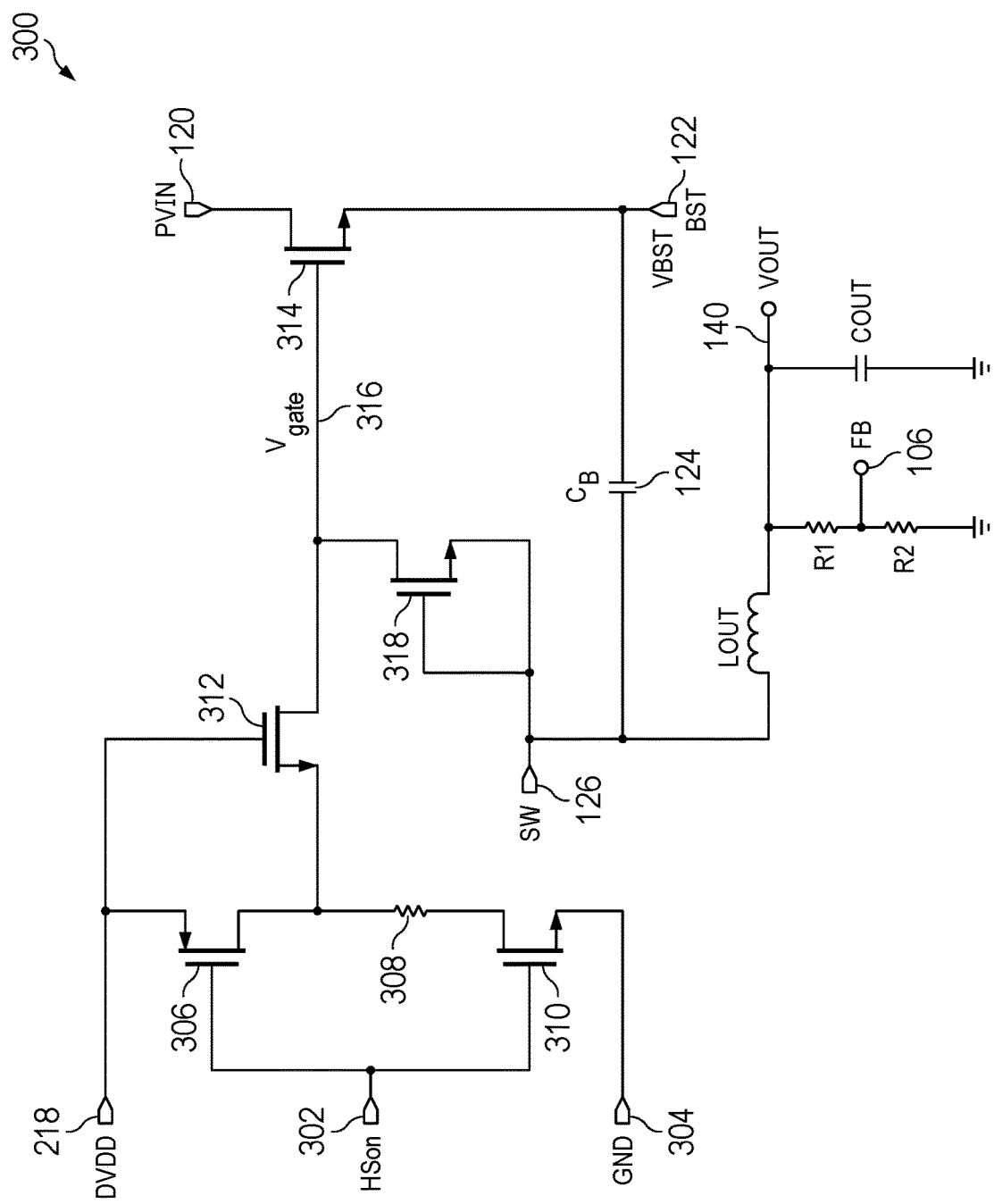
FIG. 3 shows a schematic diagram for an example boost charging circuit having a single drive transistor between a voltage input terminal and a boost terminal.

FIG. 3 shows a schematic diagram for an example boost charging circuit 300 having a single drive transistor between the voltage input terminal PVIN 120 and the boost terminal 126. The single drive transistor of boost charging circuit 300 stands in contrast to boost charging circuit 200, which has two drive transistors between the voltage input terminal PVIN 120 and the boost terminal 126. The boost charging circuit 300 includes boost capacitor $C_B$ 124 and provides a boost voltage $V_{BST}$ at the boost terminal BST 122.

Transistor 314 is coupled between the voltage input terminal PVIN 120 and the boost terminal BST 122. The voltage at the gate of transistor 314 is $V_{gate}$ 316. Transistor 312 has a drain coupled to the gate of transistor 314, and has a gate coupled to voltage supply terminal DVDD 218. In at least one case, transistor 312 is a natural threshold NFET. Transistor 314 is a natural threshold NFET, and it provides isolation between the low voltage domain of DVDD 218 and the high voltage domain at the BST terminal 122. Being natural threshold NFETs, transistors 314 and 312 turn on with a gate-to source voltage $V_{GS}$ near zero.

Transistor 306 and transistor 310 are coupled in series between DVDD 218 and GND 304. Transistor 306 is a P-channel field effect transistor (PFET), and transistor 310 is an NFET. The source of transistor 306 is coupled to voltage supply terminal DVDD 218. The drain of transistor 306 is coupled to the source of transistor 312. The gate of transistor 306 is coupled to the gate of transistor 310 and to the $HS_{on}$ terminal 302. The $HS_{on}$ terminal 302 is coupled to the gate of the high-side drive FET of a voltage regulator (not shown), and provides a high-side drive signal to control turning on or turning off the high-side drive FET of a voltage regulator. The high-side drive signal controls turning on or turning off transistor 306 and transistor 310. A logic high on $HS_{on}$ 302 turns transistor 310 on and turns transistor 306 off. A logic low on $HS_{on}$ terminal 302 turns transistor 306 on and turns transistor 310 off.

The source of transistor 310 is coupled to GND 304. Resistor 308 is coupled between the drain of transistor 306 and the drain of transistor 310, and has a terminal coupled to the source of transistor 312. Transistor 318 is an NFET that is coupled between the gate of transistor 314 and the SW terminal 126. The gate of transistor 318 is coupled to the SW terminal 126. The signal at the SW terminal 126 controls turning transistor 318 on or off.

If the high-side drive FET of the voltage regulator is off, the signal at $HS_{on}$ 302 is at logic low, the voltage at the SW terminal 126 is at ground. If the signal at $HS_{on}$ 302 is logic low, transistor 306 is turned on and transistor 310 is turned off, thereby charging the gate voltage $V_{gate}$ 316 of transistor 314 to the voltage at DVDD 218, which may be around 5V. The gate-to-source voltage of transistor 314 is equal to the voltage at the BST terminal 122 subtracted from the voltage at DVDD 218, thereby turning on transistor 314. With transistor 314 turned on, current from the PVIN terminal 120 charges boost capacitor $C_B$ 124. Charging boost capacitor $C_B$ 124 increases the boost voltage $V_{BST}$ at the BST terminal 122.

If the high-side drive FET of the voltage regulator is turned on, $HS_{on}$ 302 is at logic high. With $HS_{on}$ 302 at logic high, transistor 306 is turned off and transistor 310 is turned on, which causes the gate voltage $V_{gate}$ 316 of transistor 314 to decrease. In this case, $V_{gate}$ is equal to the threshold voltage of transistor 314 $V_{th}$ subtracted from the voltage at the SW terminal 126, so transistor 314 is turned off.

If the high-side drive FET of the voltage regulator is off and the low-side drive FET of the voltage regulator is on, the voltage at the gate of transistor 314 $V_{gate}$ is at the voltage of DVDD 218. With $V_{gate}$ at the voltage of DVDD, transistor 314 is turned on. Transistor 312 remains turned on and provides isolation of the lower voltage domain of DVDD 218 from the higher voltage domain of PVIN 120. This voltage isolation allows the use of FETs having a lower drain-to-source voltage in the boost circuit, which usually have a lower cost than high-voltage FETs that have a higher maximum drain-to-source voltage specification.

When $HS_{on}$ 302 is at logic low, the gate voltage $V_{gate}$ 316 of transistor 314 is charged to the voltage of DVDD 218. In this case, the gate-to-source voltage of transistor 314, $V_{GS}$, is equal to the voltage $V_{BST}$ at the BST terminal 122 subtracted from the voltage of DVDD 218. Transistor 314 turns on causing current to flow from PVIN 120 and charge the boost terminal BST 122 to a higher voltage.

When $HS_{on}$ 302 is at logic high, the gate voltage $V_{gate}$ 316 of transistor 314 will discharge to a voltage equal to the voltage at the switch terminal SW 126 minus the threshold voltage of transistor 314, $V_{th}$. The gate-to-source voltage of transistor 314, $V_{GS}$, will be equal to $-V_{th}$, turning off transistor 314. Leakage from BST 122 to PVIN 120 is avoided by turning off transistor 314.

Figure 4:
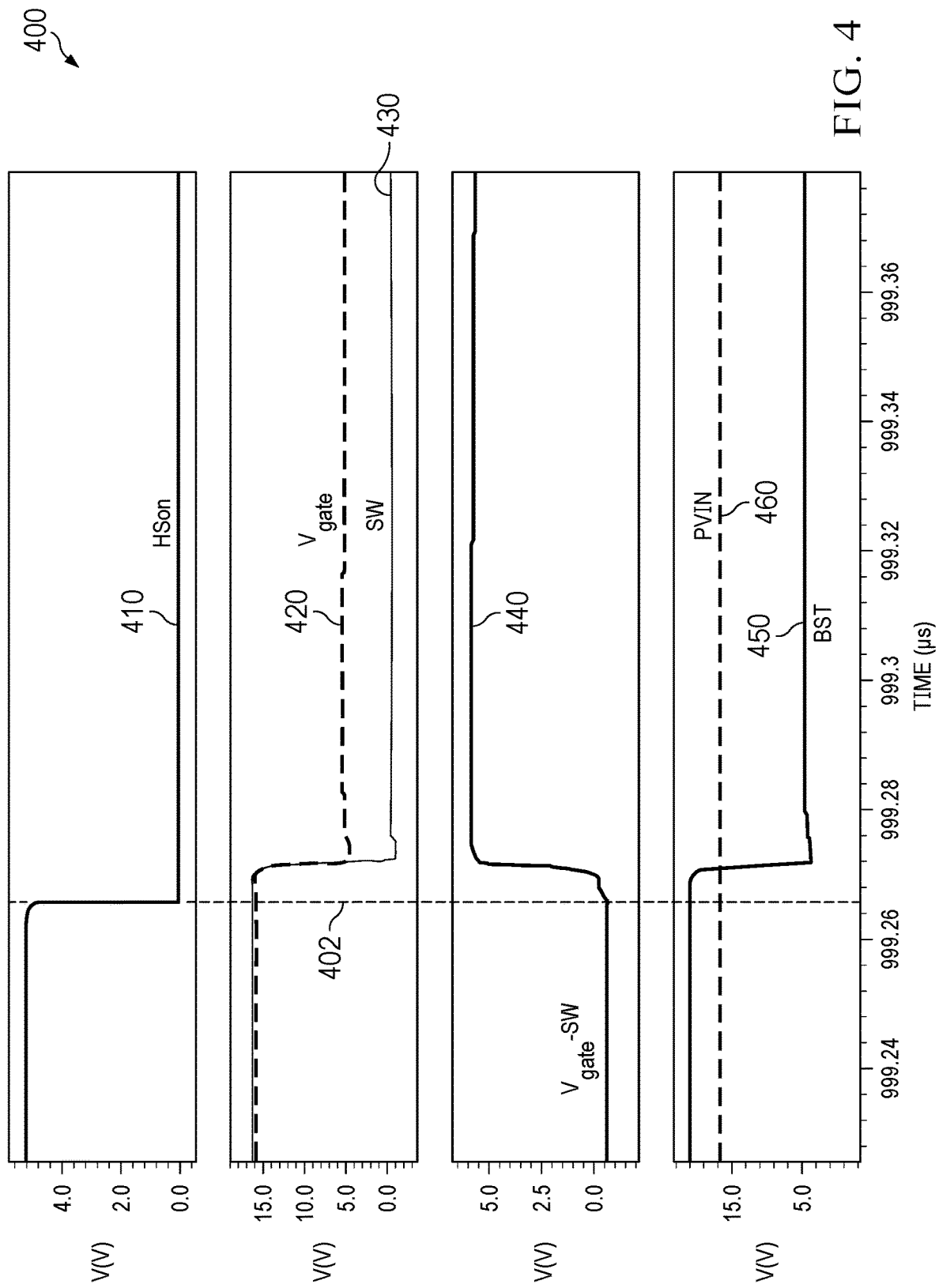
FIG. 4 shows an example timing diagram for a boost charging circuit having a single drive transistor between a voltage input terminal and a boost terminal, wherein the high-side drive FET of the voltage regulator is turning off.

FIG. 4 shows an example timing diagram 400 for a boost charging circuit having a single drive transistor between a voltage input terminal and a boost terminal, wherein the high-side drive FET of the voltage regulator is turning off. Signal 410 is the voltage at the $HS_{on}$ terminal 302. Signal 420 is the gate voltage $V_{gate}$ 316 of transistor 314. Signal 430 is the voltage at the switch terminal SW 126. Signal 440 is the voltage difference signal between the gate voltage $V_{gate}$ 316 of transistor 314 and the voltage at the switch terminal SW 126. Signal 450 is the voltage at the voltage input terminal PVIN 120. Signal 460 is the voltage at the boost terminal BST 122.

At time 402, $HS_{on}$ 410 transitions from high to low. As $HS_{on}$ 410 goes low, the high-side drive FET of the voltage regulator turns off. The voltage at the switch terminal SW 126 will depend on whether the low-side drive FET of the voltage regulator is on or off. If the low-side drive FET of the voltage regulator is on with the high-side drive FET of the voltage regulator off, the switch terminal SW 126 will be at ground. If the low-side drive FET and the high-side drive FET of the voltage regulator are off, the voltage at the switch terminal SW 126 will be at the output voltage of the voltage regulator, VOUT 140.

Transistor 306 is turns on and the gate voltage of transistor 314, $V_{gate}$ 420 is charged to the voltage of DVDD 218. The gate-to-source voltage of transistor 314, $V_{GS}$, is equal to the voltage 450 at the BST terminal 122 subtracted from the voltage at DVDD 218. Transistor 314 is turned on and current flows from PVIN 120 to charge the boost capacitor $C_B$ 124, increasing the voltage VBST at the boost terminal BST 122.

Figure 5:
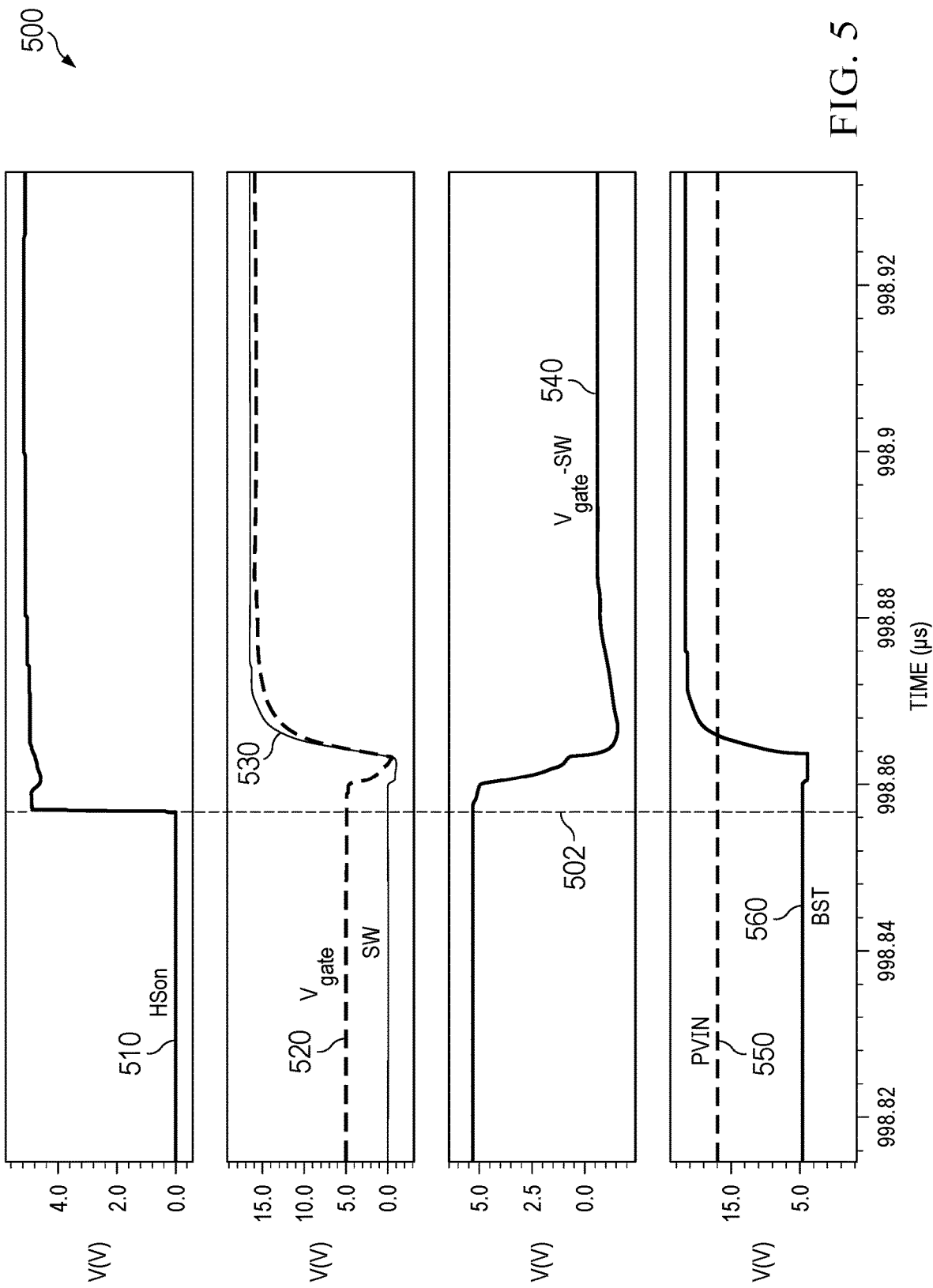

FIG. 5 shows an example timing diagram 500 for a boost charging circuit having a single drive transistor between a voltage input terminal and a boost terminal, wherein the high-side drive FET of the voltage regulator is being turned on. Signal 510 is the voltage at the $HS_{on}$ terminal 302. Signal 520 is the gate voltage $V_{gate}$ 316 of transistor 314. Signal 530 is the voltage at the switch terminal SW 126. Signal 540 is the difference signal between the gate voltage $V_{gate}$ 316 of transistor 314 and the voltage at the switch terminal SW 126. Signal 550 is the voltage at the voltage input terminal PVIN 120. Signal 560 is the voltage at the boost terminal BST 122.

At time 502, $HS_{on}$ transitions from low to high, indicating that the highs-side FET of the voltage regulator is being turned on. The voltage at the switch terminal SW 126 is equal to the voltage at the voltage input terminal PVIN 120. Transistor 310 is turned on, and the gate voltage $V_{gate}$ 316 of transistor 314 discharges. The body diode of transistor 318 clamps the gate voltage $V_{gate}$ 316 of transistor 314 to a voltage equal to $(SW-V_{th})$.

The voltage at the source of transistor 314 is equal to $V_{BST}$, and the voltage at the drain of transistor 314 is equal to the voltage at PVIN 120. The voltage at the gate of transistor 314, $V_{gate}$ is equal to the voltage at the SW terminal 126 minus the threshold voltage of transistor 318. The voltage at the SW terminal 126 is equal to the voltage at PVIN 120. So, $V_{gate}$ 316 is equal to the voltage at PVIN 120 minus the threshold voltage of transistor 318. Because the voltage at the gate of transistor 314 is lower than the voltage at the source of transistor 314, the transistor is turned off. Transistor 314 is turned off to avoid leakage current flowing from BST 122 to PVIN 120.

In this description, "terminal," "node," "interconnection," "lead" and "pin" are used interchangeably. Unless specifically stated to the contrary, these terms generally mean an interconnection between or a terminus of a device element, a circuit element, an integrated circuit, a device, or other electronics or semiconductor component.

In this description, "ground" includes a chassis ground, an Earth ground, a floating ground, a virtual ground, a digital ground, a common ground and/or any other form of ground connection applicable to, or suitable for, the teachings of this description.

In this description, the term "couple" may cover connections, communications or signal paths that enable a functional relationship consistent with this description. For example, if device A generates a signal to control device B to perform an action, then: (a) in a first example, device A is coupled to device B by direct connection; or (b) in a second example, device A is coupled to device B through intervening component C if intervening component C does not alter the functional relationship between device A and device B, so device B is controlled by device A via the control signal generated by device A.

In this description, even if operations are described in a particular order, some operations may be optional, and the operations are not necessarily required to be performed in that particular order to achieve specified results. In some examples, multitasking and parallel processing may be advantageous. Moreover, a separation of various system components in the embodiments described above does not necessarily require such separation in all embodiments.

Modifications are possible in the described embodiments, and other embodiments are possible, within the scope of the claims.

What is claimed is:

1. A boost circuit for a DC/DC voltage converter, the boost circuit comprising:
   a first transistor coupled between an input voltage terminal and a boost terminal and having a first control terminal;
   a second transistor coupled between the first control terminal and a switch terminal and having a second control terminal, wherein the second control terminal is coupled to the switch terminal;
   a capacitor coupled between the boost terminal and the switch terminal;
   a third transistor having a third control terminal and first and second current terminals, wherein the third control terminal is coupled to an internal voltage supply terminal, and the first current terminal is coupled to the first control terminal; and
   a fourth transistor coupled between the internal voltage supply terminal and the second current terminal and having a fourth control terminal, wherein the fourth control terminal is coupled to a drive terminal.

2. The boost circuit of claim 1, wherein the first transistor and the second transistor are natural threshold N-channel field effect transistors (NFETs).

3. The boost circuit of claim 1, further comprising a fifth transistor coupled between the second current terminal and a ground terminal and having a fifth control terminal, wherein the fifth control terminal is coupled to the drive terminal.

4. The boost circuit of claim 3, wherein the fourth transistor is a P-channel field effect transistor (PFET), and the fifth transistor is an NFET.

5. The boost circuit of claim 4, further comprising a resistor coupled between the fourth transistor and the fifth transistor.

6. The boost circuit of claim 2, further comprising an inductor coupled between the switch terminal and an output voltage terminal.

7. The boost circuit of claim 6, further comprising:
   a first resistor coupled between the output voltage terminal and a feedback terminal;
   a second resistor coupled between the feedback terminal and a ground terminal; and
   a capacitor coupled between the output voltage terminal and the ground terminal.

8. The boost circuit of claim 2, wherein the third transistor is an NFET.

9. The boost circuit of claim 2, wherein a voltage at the first control terminal equals a voltage at the internal voltage supply terminal responsive to a drive signal at the drive terminal having a first logic state.

10. The boost circuit of claim 9, wherein the voltage at the first control terminal equals a voltage at the switch terminal minus a threshold voltage of the first transistor responsive to the drive signal having a second logic state, in which the second logic state is opposite the first logic state.

11. A voltage regulator circuit, comprising:
    a high-side drive circuit having a drive input, a drive output and a drive supply input, wherein the drive input is coupled to a high-side drive terminal;
    a boost charging circuit having a boost input and a boost output, wherein the boost input is coupled to an input voltage terminal, and the boost output is coupled to the drive supply input; and
    a high-side transistor having a high-side control terminal, wherein the high-side transistor is coupled between the input voltage terminal and a switch terminal, and the high-side control terminal is coupled to the drive output;
    wherein the boost charging circuit includes:
       a first transistor coupled between an input voltage terminal and a boost terminal and having a first control terminal;
       a second transistor coupled between the first control terminal and a switch terminal and having a second control terminal, wherein the second control terminal is coupled to the switch terminal;
       a capacitor coupled between the boost output and the switch terminal; and
       a third transistor having a third control terminal and first and second current terminals, wherein the third control terminal is coupled to an internal voltage supply terminal, and the first current terminal is coupled to the first control terminal.

12. The voltage regulator circuit of claim 11, wherein the first transistor and the second transistor are natural threshold N-channel field effect transistors (NFETs).

13. The voltage regulator circuit of claim 12, further comprising a fourth transistor coupled between the internal voltage supply terminal and the second current terminal and having a fourth control terminal, wherein the fourth control terminal is coupled to a drive terminal.

14. The voltage regulator circuit of claim 13, further comprising a fifth transistor coupled between the second current terminal and a ground terminal and having a fifth control terminal, wherein the fifth control terminal is coupled to the drive terminal.

15. The voltage regulator circuit of claim 14, wherein the fourth transistor is a P-channel field effect transistor (PFET), and the fifth transistor is an NFET.

16. The voltage regulator circuit of claim 15, further comprising a resistor coupled between the fourth transistor and the fifth transistor.

17. The voltage regulator circuit of claim 12, further comprising an inductor coupled between the switch terminal and an output voltage terminal.

18. The voltage regulator circuit of claim 17, further comprising:
    a first resistor coupled between the output voltage terminal and a feedback terminal;
    a second resistor coupled between the feedback terminal and a ground terminal; and
    a capacitor coupled between the output voltage terminal and the ground terminal.

19. The voltage regulator circuit of claim 13, wherein a voltage at the first control terminal equals a voltage at the internal voltage supply terminal responsive to a drive signal at the drive terminal having a first logic state.

20. The voltage regulator circuit of claim 19, wherein the voltage at the first control terminal equals a voltage at the switch terminal minus a threshold voltage of the first transistor responsive to the drive signal having a second logic state, in which the second logic state is opposite the first logic state.

* * * * *